United States Patent
Tang

(10) Patent No.: US 7,248,624 B2
(45) Date of Patent: Jul. 24, 2007

(54) BIT SYNCHRONIZATION IN A COMMUNICATIONS DEVICE

(75) Inventor: Kai Tang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 411 days.

(21) Appl. No.: 10/650,866

(22) Filed: Aug. 28, 2003

(65) Prior Publication Data

US 2007/0147483 A1 Jun. 28, 2007

(51) Int. Cl.
*H04B 1/69* (2006.01)
*H04L 7/00* (2006.01)

(52) U.S. Cl. ...................... 375/149; 375/355

(58) Field of Classification Search ............... 375/134, 375/137, 145, 149, 225, 227, 326, 340, 343–344, 375/355, 367; 370/515; 342/356, 357.06, 342/357.08, 357.12
See application file for complete search history.

(56) References Cited

U.S. PATENT DOCUMENTS

| | | | | |
|---|---|---|---|---|
| 5,596,333 A | * | 1/1997 | Bruckert | 342/457 |
| 5,832,026 A | * | 11/1998 | Li | 375/136 |
| 6,134,280 A | * | 10/2000 | Matui | 375/341 |
| 6,233,273 B1 | * | 5/2001 | Webster et al. | 375/148 |
| 6,795,490 B2 | * | 9/2004 | Belotserkovsky | 375/150 |
| 2003/0081662 A1 | | 5/2003 | Rick et al. | 375/150 |
| 2003/0227963 A1 | | 12/2003 | Dafesh | 375/149 |

FOREIGN PATENT DOCUMENTS

| | | |
|---|---|---|
| EP | 0757458 | 2/1997 |
| EP | 1244225 | 9/2002 |
| WO | 0014560 | 3/2000 |

* cited by examiner

*Primary Examiner*—Young T. Tse
(74) *Attorney, Agent, or Firm*—Thomas Rouse; Bruce W. Greenhaus; James D. McFarland

(57) ABSTRACT

Systems and techniques are disclosed relating to communications. The systems and techniques involve the synchronizing to a signal having a plurality of bits by computing energy for a plurality of different phase offset signal portions, generating a ratio from the signal portion with the highest computed energy and the signal portion with the second highest computed energy, and comparing the ratio to a threshold to determine whether the signal portion with the highest computed energy can be used to determine bit timing.

6 Claims, 3 Drawing Sheets

BIT SYNCHRONIZATION IN A COMMUNICATIONS DEVICE

BACKGROUND

1. Field

The present invention relates generally to communications, and more specifically, to various systems and techniques to synchronize a receiver to a data bit stream carried in a signal transmission.

2. Background

The Global Positioning System (GPS) is part of a satellite based navigation system developed by the United States Department of Defense. It provides global coverage with precision navigation under various environmental conditions. In a fully operational GPS, the entire surface of the earth is covered by 24 satellites which orbit the earth in 12 hours. These satellites are arranged in six orbital planes each containing four satellites. The orbital planes are spaced 60° apart from each other and are inclined approximately 55° with respect to the equatorial plane.

Each GPS satellite transmits two spread-spectrum L-band carriers. The first L-band carrier (L1) is modulated by two pseudo-random-noise (PN) codes, a coarse acquisition code (C/A-code) and a precision code (P-code). The second L-band carrier (L2) is modulated only by the P-code. Civilian navigation receivers use only the C/A code on the L1 carrier. The C/A code belongs to a family known as Gold codes.

Gold codes are relatively short codes with a chip rate of 1.023 MHz and a length of 1023 chips, and thus repeat every one millisecond. One cycle of 1023 chips is called a "PN frame." Each GPS satellite transmits a signal with a unique Gold code. Superimposed on the Gold code, at 50 bits per second, is a binary phase shift keyed (BPSK) signal with bit boundaries aligned with the beginning of a PN frame. The 50 Hz signal contains the satellite ephemeris, the almanac for all other satellites, clock error parameters, and satellite status.

The GPS receiver has a clock that is synchronized to the satellite clocks. Each satellite clock is used to initiate a transmission of a GPS signal spread by the appropriate Gold code. At the same time, the GPS receiver clock begins generating the same Gold codes. When the GPS signal from any given satellite arrives at the GPS receiver, the Gold code used to spread the GPS signal will lag behind the locally generated Gold code. The GPS receiver determines this lag through an acquisition process by shifting in time the locally generated Gold code until it is aligned with the GPS signal. The time adjustment necessary to bring the two into alignment represents the pseudo-range of the satellite. The term pseudo-range is used because it contains an offset corresponding to the error in the GPS receiver's clock. After obtaining four or more pseudo-ranges from four or more satellites, the GPS receiver, with the knowledge of the satellite data, can obtain a navigational solution to pinpoint its exact location on earth.

The satellite data may be recovered from the GPS signal through a correlation process. The correlation process entails multiplying successive one millisecond portions of the GPS signal with the locally generated Gold code and integrating the product. The correlation results may be accumulated over a 20 millisecond bit period and phase detected to determine each bit value. Normally, the GPS receiver has no prior knowledge of the bit timing, and therefore, an ambiguity exists as to which 20 correlation results should be accumulated. If the correlation results are accumulated over a bit boundary with a bit transition, the ability of the GPS receiver to detect the bit value may be significantly degraded. Accordingly, there is a need for a robust process for resolving bit timing in a reliable fashion. The method should be adaptive to changing environmental conditions and applicable to various technologies.

SUMMARY

In one aspect of the present invention, a method of synchronizing to a signal having a plurality of bits includes computing energy for a plurality of different phase offset signal portions, generating a ratio from the signal portion with the highest computed energy and the signal portion with the second highest computed energy, and comparing the ratio to a threshold to determine whether the signal portion with the highest computed energy can be used to determine bit timing.

In another aspect of the present invention, a communications apparatus includes a receiver configured to receive a signal having a plurality of bits, and a synchronization module configured to compute energy for a plurality of different phase offset signal portions, generate a ratio from the signal portion with the highest computed energy and the signal portion with the second highest computed energy, and compare the ratio to a threshold to determine whether the signal portion with the highest computed energy can be used to determine bit timing.

In yet another aspect of the present invention, a synchronization module for a signal having a plurality of bits includes means for computing energy for a plurality of signal portions each having a different phase offset, means for generating a ratio from the signal portion with the highest computed energy and the signal portion with the second highest computed energy, and means for comparing the ratio to a threshold to determine whether the signal portion with the highest computed energy can be used to determine bit timing.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 2 is a conceptual block diagram illustrating an example of a synchronization module for a communications device, such as a GPS receiver or the like.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention will be described in the context of a GPS receiver. While these inventive aspects may be well suited for use with this application, those skilled in the art will readily appreciate that these inventive aspects are likewise applicable for use in various other communication systems. Accordingly, any reference to a GPS receiver is intended only to illustrate the inventive aspects, with the understanding that such inventive aspects have a wide range of applications.

Figure 1:
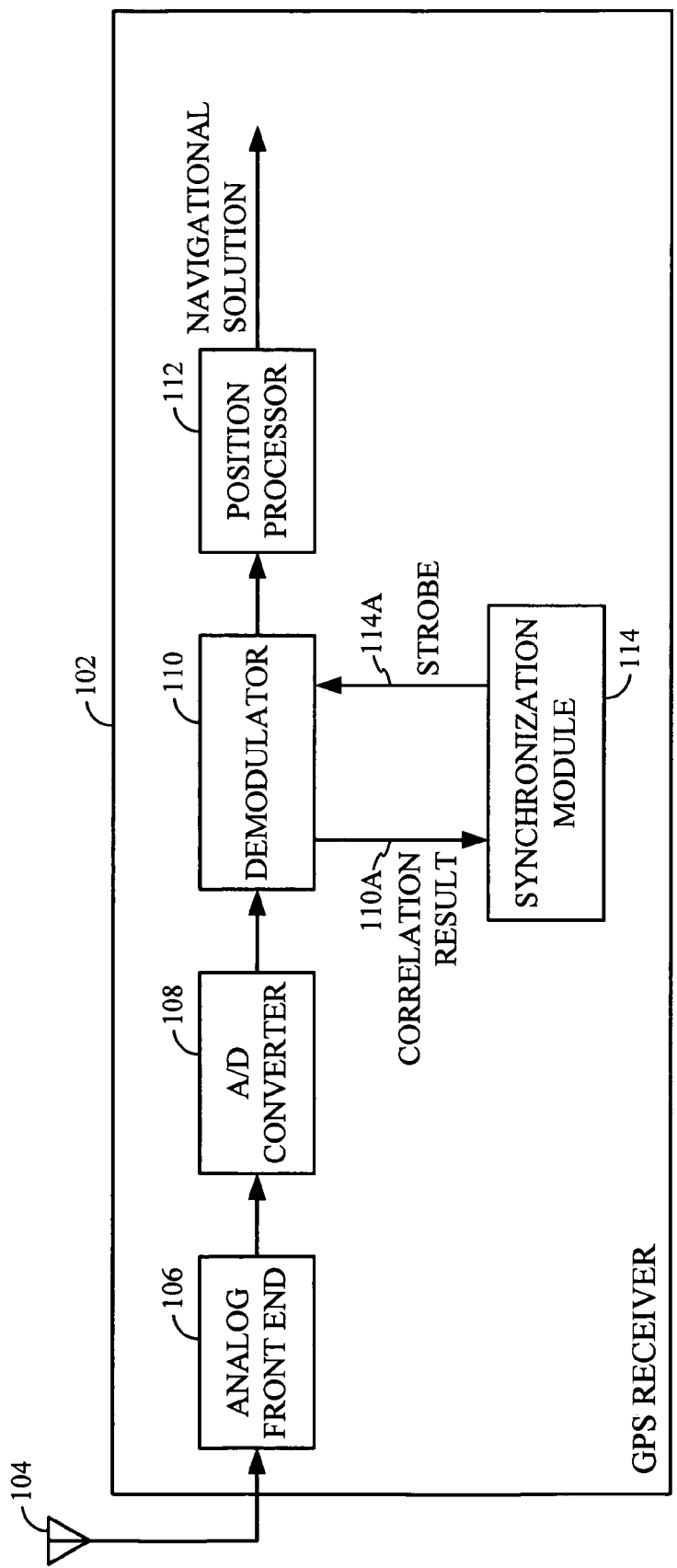
FIG. 1 is a conceptual block diagram illustrating an example of a GPS receiver.

A conceptual block diagram illustrating one embodiment of a GPS receiver is shown in FIG. 1. The GPS receiver 102 may be configured as a complex quadrature system, however, for ease of explanation, the GPS receiver 102 is depicted functionally in FIG. 1 without reference to separate I (in-phase) and Q (quadrature) channels. An antenna 104 may be used to couple GPS signals propagating in free space to the GPS receiver 102. The GPS receiver 102 may include an analog front end (AFE) 106 having any number of amplifier stages and filters to boost the signal level and reduce front end noise. The AFE 106 may be used to produce baseband signals based on either a heterodyne or direct conversion architecture. The baseband signals may be converted to a digital signal by an analog-to-digital converter (ADC) 108. The digital signal contains the data from the various satellites spread with the appropriate Gold codes.

A demodulator 110 may be used to recover the satellite data. The demodulator 110 may be configured with parallel processors (not shown) each dedicated to demodulating a GPS signal from a different satellite. Alternatively, the demodulation of the various GPS signals may be performed in a serial fashion by time sharing the same processing resources. Either way, the demodulator 110 may be used to acquire each visible GPS signal and despread each GPS signal acquired.

The acquisition of a GPS signal may be achieved by correlating the digital signal from the ADC 108 with the appropriate Gold code. By adjusting the relative timing of a locally generated Gold code relative to the digital signal from the ADC 108, and observing the correlation result, the demodulator 110 may determine the time lag of the GPS signal relative to the GPS receiver's clock (not shown). The time delay may be used to adjust the GPS receiver's clock to determine the pseudo-range for the satellite. Multiple frequency hypotheses may be required during the acquisition phase to account for the Doppler frequency. A tracking function may be performed by the demodulator 110 to adjust the local clock (not shown) to maintain a high correlation result.

During the tracking phase, the demodulator 110 may be used to accumulate the one millisecond correlation results to produce a 50 Hz BPSK signal. This may be achieved by successively accumulating 20 consecutive correlation results and converting each 20 millisecond accumulation into a BPSK signal based on the accumulated result. A synchronization module 114 may be used to trigger each accumulation. The 50 Hz BPSK signal may then be demapped into a 50 Hz signal containing the satellite data. The satellite data may be provided to a position processor 112. The position processor 112 may use the satellite data and the pseudo-ranges from the various satellites to compute a navigational solution.

The synchronization module 114 may be used to extract bit timing information from the GPS signal. The bit timing information may be used by the synchronization module 114 to control the demodulator 110 to prevent the accumulation of the correlation results across bit boundaries. More specifically, the synchronization module 114 may be used to produce a strobe 114a at the bit boundaries from the correlation results 110a generated in the demodulator 110. The strobe 114a may be used by the demodulator 110 to trigger a new accumulation sequence.

Figure 2:
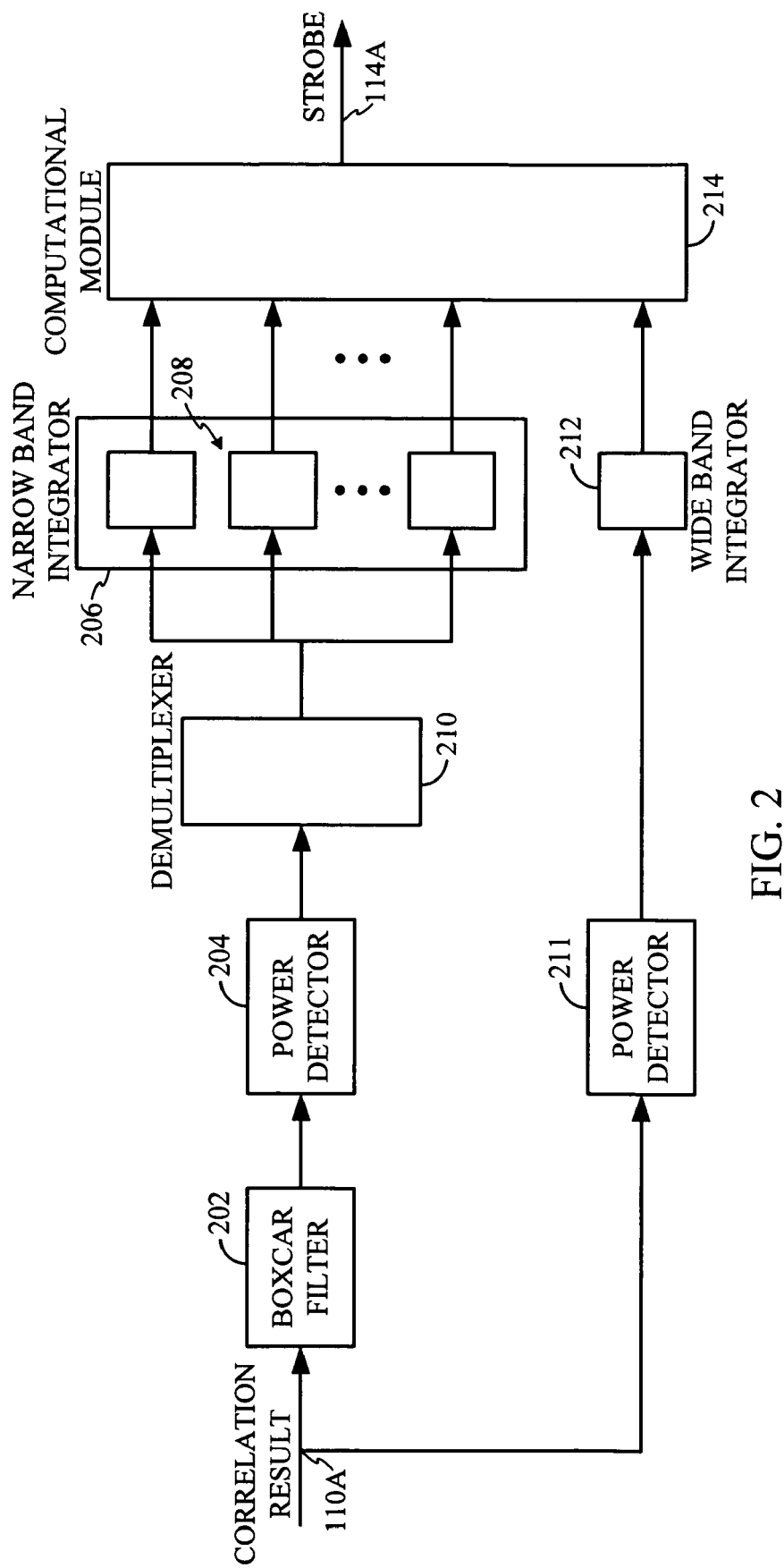
Figure 3:
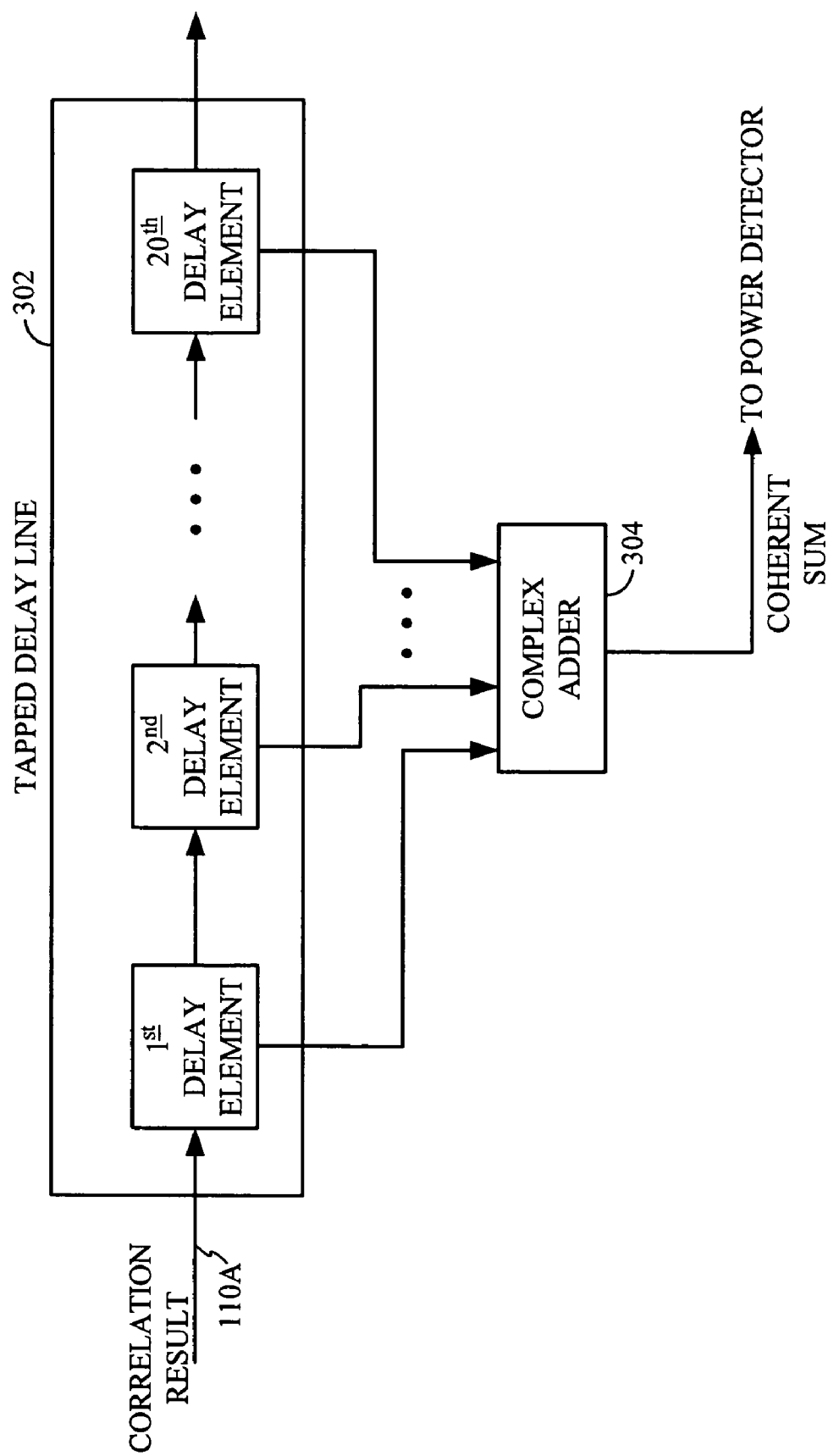
FIG. 3 is a conceptual block diagram illustrating an example of a boxcar filter for a synchronization module.

A conceptual block diagram illustrating an example of a synchronization module is shown in FIG. 2. The one millisecond correlation results from the demodulator 110 (see FIG. 1) may be provided to a boxcar filter 202. Functionally, the boxcar filter 202 may be thought of as a tapped delay line feeding a complex adder. A functional representation of the boxcar filter is shown in FIG. 3. The tapped delay line 302 may be constructed from 20 delay elements arranged in series. In operation, the correlation results from the demodulator 110 (see FIG. 1) may be sequentially shifted through the tapped delay line 302 at a 1 KHz rate. The output of the delay elements may be coherently integrated (summed) using a complex adder 304 to produce a coherent sum across a 20 millisecond sample of the BPSK signal.

Returning to FIG. 2, the coherent sum produced by the boxcar filter 202 may be provided to a power detector 204. The power detector 204 may be used to convert the coherent sum from a complex sequence with both magnitude and phase information into a power estimate. The power detector 204 may achieve this function through a multiplication process which takes the $I^2+Q^2$ product of the coherent sum. The result of the boxcar filter 202 working in conjunction with the power detector 204 is to produce a sequence of power estimates each representing the energy accumulated over a different 20 millisecond portion of the BPSK signal. Since there are 20 PN frames per bit and the bit boundaries are aligned with the beginning of a PN frame, each 20 consecutive power estimates produced by the power detector 204 will result in one power estimate for a 20 millisecond portion of the BPSK signal that does not cross the bit boundaries. This 20 millisecond portion is time aligned with the data bit stream and may be used for bit synchronization.

A methodology may be employed by the synchronization module to identify the 20 millisecond portion of the BPSK signal that is time aligned with the data bit stream. This may be achieved by evaluating 20 consecutive power estimates (20 bit position hypotheses) and selecting the one with the highest energy. This may be a reliable approach in a noise free environment if a bit transition occurs at the bit boundary. However, as a practical matter, this approach should be modified to account for noise, as well as the fact that a bit transition does not necessarily occur at every bit boundary. Therefore, each of the 20 consecutive power estimates should be accumulated over an observation period which extends across multiple bit boundaries. The longer the observation period, the higher the probability of correctly detecting the bit boundaries due to more bit transitions. In addition, a longer observation period may provide increased noise immunity.

The power estimates for each of the 20 bit position hypotheses may be accumulated in a 50 Hz bandwidth with a narrow band integrator 206. The narrow band integrator 206 may be implemented with 20 narrow band time offset integrators 208 operating in parallel. The output of each integrator forms a narrow band power (NBP) estimate for its corresponding bit position hypothesis. A demultiplexer 210 may be used to switch the power estimate from the power detector 204 to the appropriate integrator 208. Alternatively, a single narrow band integrator in combination with memory may be used in a time sharing manner to generate the NBP estimates.

A wide band power (WBP) estimate may also be computed for each of the 20 bit position hypothesis. A power detector 211 may be used to convert the correlation results from the demodulator 110 (see FIG. 1) into an $I^2+Q^2$ product (i.e., a power estimate without phase information). The output of the power detector 211 may be used to feed a wide band integrator 212 which accumulates the power estimates in a 1 KHz bandwidth for each of the 20 bit position hypotheses during its respective observation period. In a manner similar to the narrow band integrator 206, the wide band integrator 212 may also be implemented with 20 time offset integrators (not shown) each having an output forming a WBP estimate for its corresponding bit position hypothesis. In various embodiments of the synchronization module, where the observation period is much larger than the 1 millisecond time offset, a single wide band integrator (not shown) may be used to save processing resources. In this case, the same WBP estimate may be used for each of the 20 bit position hypotheses. In any event, the NBP and WBP estimates may be provided to a computational module 214 to compute a SNR estimate for each bit position hypothesis and determine bit timing.

The expected values of the NBP and the WBP estimates for any given bit position hypothesis can be represented by the following equations:

$$NBP = N_{bit}(400A^2 + 40\sigma^2) \quad (1),$$

$$WBP = N_{bit}(20A^2 + 40\sigma^2) \quad (2),$$

where:

$N_{bit}$ is the observation period in terms of data bits,

A is the amplitude of the BPSK signal in the 1 millisecond correlation result, and $\sigma$ is the variance of the noise in the 1 millisecond correlation result.

The computational module 214 may be configured to compute a SNR estimate for each of the 20 bit position hypotheses from equations (1) and (2). The SNR estimate may be computed for any given bit position hypothesis from the following equation:

$$SNR = A^2/2\sigma^2 = (NBP - WBP)/(20WBP - NBP) \quad (3).$$

Depending on the length of the observation period, frequency offsets due to drift and Doppler shifts in the GPS signal could impact the accuracy of the SNR estimates. In the GPS receiver described thus far, the tracking function in the demodulator 110 (see FIG. 1) may be used to remove these offsets. However, in GPS receivers without a tracking function, the synchronization module may be configured to compensate for any frequency offsets to ensure the accuracy of the SNR estimates over longer observation periods. This may be achieved by extending the operation of the synchronization module to a two dimensional search in bit position and frequency.

The frequency compensation function may be implemented in a variety of fashions. By way of example, the synchronization module 114 (see FIG. 1) may be configured to compute the 20 SNR estimates for the various bit position hypotheses at multiple frequency offsets. The peak SNR estimate should be found in the frequency bin that is closest to the actual frequency offset. The 20 SNR estimates from that frequency bin may be used to evaluate each bit position hypothesis. The SNR estimates from all other frequency bins may be discarded. The synchronization module 114 (see FIG. 1) may implement this function with a boxcar filter for each frequency bin. The correlation result from the demodulator 110 (see FIG. 1) may be rotated by a different amount before being input to each boxcar filter. A series combination comprising a power detector, demultiplexer, and a narrow band integrator may be provided at the output of each boxcar filter. The outputs from the narrow band integrators may be provided to the computational module to select the appropriate frequency bin and compute the SNR estimates for the 20 bit position hypothesis.

Once the SNR estimates for the 20 bit position hypotheses are computed, the synchronization module may then identify the maximum SNR estimate. The SNR estimate should be maximum for the integration correctly phased to the bit positions. The maximum SNR estimate may then be evaluated to determine whether it is a reliable indicator of bit timing. One way to make this determination is to examine the ratio of the maximum SNR estimate to the second highest SNR estimate. If the ratio is greater than a threshold, then the bit boundaries may be resolved from the maximum SNR estimate. If, on the other hand, the ratio is smaller than the threshold, the maximum SNR estimate may be deemed unreliable and no decision made. This approach may reduce decision errors in the bit timing caused by noise and/or a low number of bit transitions during the observation period.

The threshold may be selected based on performance tradeoffs between the error rate in bit synchronization and an increase in delay in resolving the bit boundaries due to a number of rejections. The threshold may be determined based on the carrier-to-noise density ratio ($C/N_o$), the observation period $N_{bit}$, and the target error rate. In a weak signal environment (i.e., low $C/N_o$), the observation period may be extended and the threshold value reduced. This should result in a reduced error rate without a corresponding increase in the rejection rate. In certain embodiments of the synchronization module employing frequency compensation, further increases in performance may be achieved by increasing the number of frequency bins. An increase in frequency bins may allow a further reduction in the threshold or a decrease in the observation period. In any event, those skilled in the art will be readily able to assess the performance tradeoffs for setting the optimal threshold for any particular application.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a communications device, or elsewhere. In the alternative, the processor and the storage medium may reside as discrete components in a communications device, or elsewhere in an access network.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communications apparatus, comprising:
a receiver section configured to receive a signal having a plurality of bits;
a synchronization module coupled to the receiver section, said synchronization module configured to compute energy for a plurality of different phase offset signal portions, generate a ratio from the signal portion with the highest computed energy and the signal portion with the second highest computed energy, and compare the ratio to a threshold to determine whether the signal portion with the highest computed energy can be used to determine bit timing;
wherein each of the bits has a bit period, and each of the signal portions comprises a plurality of sub-portions, each of the sub-portions having a time period equal to the bit period, and wherein the synchronization module is further configured to determine the bit timing by synchronizing to the sub-portions of the signal portion with the highest computed energy if the ratio exceeds the threshold; and
a position processor, wherein the synchronization module is further configured to synchronize to the sub-portions of the signal portion with the highest computed energy by providing a strobe to the position processor at the beginning of each of such sub-portions.

2. The communications apparatus of claim 1, wherein the synchronization module is further configured to compute the energy for each of the signal portions by performing a coherent integration over each of the respective sub-portions and combining the respective integration results.

3. The communications apparatus of claim 2 wherein the number of sub-portions in each of the signal portions is the same, and wherein the synchronization module is further configured to set the threshold as a function of that number.

4. The communications apparatus of claim 1 wherein each of the bits is spread with a code repeated a plurality of times over the bit period, the communications apparatus further comprising a demodulator configured to despread the bits before the energy for each of the signal portions is computed by the synchronization module.

5. The communications apparatus of claim 4 wherein the code comprises a code repetition period, the bit period being a multiple of the code repetition period, and wherein the phase offset of the signal portions is equal to the code repetition period.

6. The communications apparatus of claim 5 wherein the number of the signal portions is equal to the number of times the code is repeated over the bit period.

* * * * *